United States Patent [19]

Muto et al.

[11] 4,085,408

[45] Apr. 18, 1978

[54] LIQUID JET RECORDING APPARATUS

[75] Inventors: Masayuki Muto, Kawasaki; Norio Tashima, Tokyo; Shozo Kaieda, Yokohama; Kuniaki Kamimura, Atsugi, all of Japan

[73] Assignee: Minolta Camera Kabushiki Kaisha, Osaka, Japan

[21] Appl. No.: 655,614

[22] Filed: Feb. 5, 1976

Related U.S. Application Data

[63] Continuation-in-part of Ser. No. 495,540, Aug. 6, 1974, abandoned.

[30] Foreign Application Priority Data

| | | |
|---|---|---|
| Sep. 7, 1973 | Japan | 48-105327 |
| Sep. 10, 1973 | Japan | 48-102449 |
| Sep. 10, 1973 | Japan | 48-106389 |
| Sep. 21, 1973 | Japan | 48-106733 |
| Oct. 30, 1973 | Japan | 48-122522 |
| Nov. 10, 1973 | Japan | 48-126421 |

[51] Int. Cl.$^2$ .............................................. G01D 15/18

[52] U.S. Cl. .................................. 346/75; 346/140 R

[58] Field of Search .................................. 346/75, 140

[56] References Cited

U.S. PATENT DOCUMENTS

| | | | |
|---|---|---|---|
| 2,600,129 | 6/1952 | Richards | 346/75 X |
| 3,510,878 | 5/1970 | Johnson | 346/75 X |
| 3,787,882 | 1/1974 | Fillmore | 346/75 |
| 3,810,194 | 5/1974 | Tokunaga | 346/75 |
| 3,893,126 | 7/1975 | Ascoli | 346/75 X |
| 3,968,498 | 7/1976 | Uchiyama | 346/29 |

*Primary Examiner*—Joseph W. Hartary

*Attorney, Agent, or Firm*—Wenderoth, Lind & Ponack

[57] ABSTRACT

A liquid jet recording apparatus which effects non-impact recording by the application of a jet of liquid ink to a recording medium. The liquid jet recording apparatus includes means for stabilizing the frequency of droplets of the liquid ink jetted from the exit end of a nozzle and also for improving the droplet frequency to a relatively high value. The provision of this means is advantageous in that a line of uniform line width and of uniform ink deposit can be drawn thereby. In addition, means is disclosed to eliminate the use of electrical parts which are expensive and require a relatively high voltage withstanding characteristic.

15 Claims, 44 Drawing Figures

FIG. 1
Prior Art
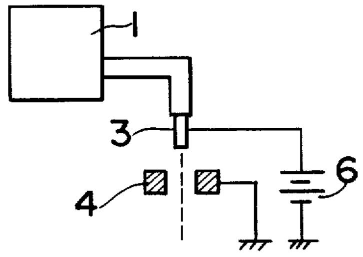
FIG. 2
Prior Art
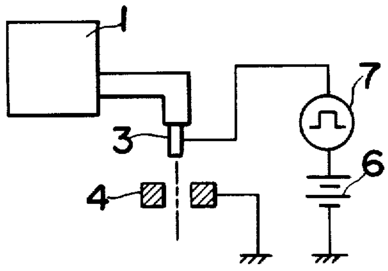
FIG. 3
Prior Art
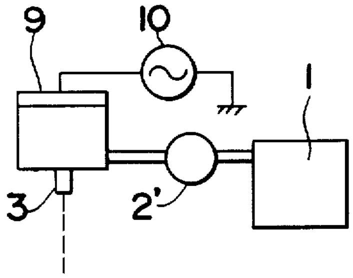
FIG. 5(a)
FIG. 5(b)
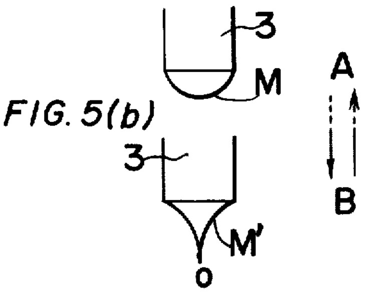
FIG. 4
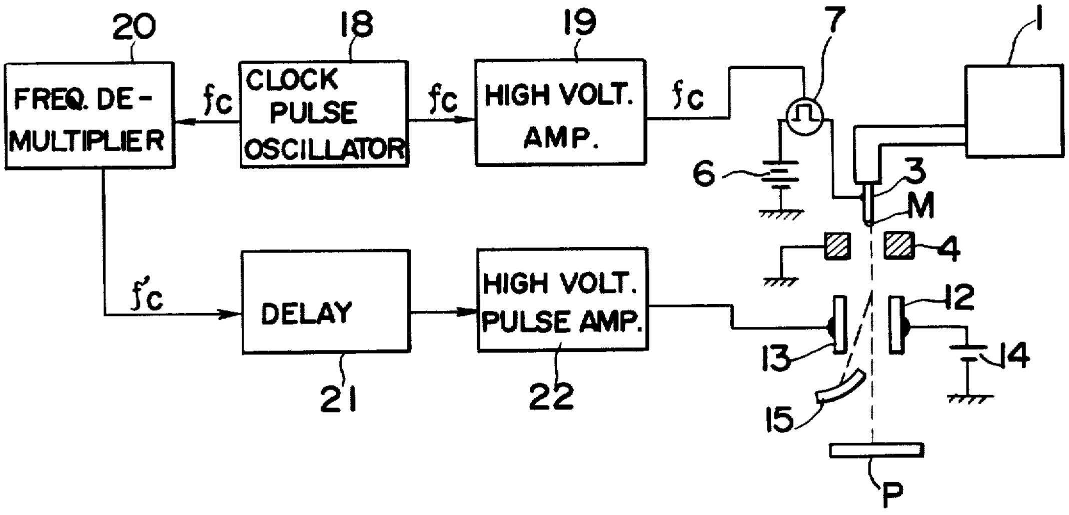

(b)

(a)

LIQUID JET RECORDING APPARATUS

This is a continuation-in-part of application Ser. No. 495,540, filed Aug. 6, 1974 now abandoned.

BACKGROUND OF THE INVENTION

The present invention relates to an improved liquid jet recording apparatus which effects non-impact or non-contact recording by the application of a jet or liquid marking medium, for example, liquid ink, to a recording medium.

Heretofore, two types of recording apparatus have been known. The recording apparatus of one type employs a recording head of a contact recording system which comprises a hollow fountain pen, a ball-point pen or a similar member adapted to contact a recording medium to draw or delineate, for example, a line on the recording medium. In such a recording apparatus, in order to interrupt the recording operation, the recording head has to be moved up and down and, therefore, the following disadvantages are observed. In other words, in view of the contact recording system, wear of the pen point, interruption of supply of ink, ink clogging, a spoiled surface of a recording medium, dust present on the surface of the recording medium, the smoothness of the surface of the recording medium, etc. often provoke problems to be solved. In addition, due to the fact that the up and down movement of the recording head requires a mechanism for effecting this movement, the recording head employed has to be of a relatively great size and often constitutes a source of noise and is not suited for high speed recording of a line of not more than 0.2 mm. in line width.

The recording apparatus of the other type employs a recording head of a non-impact or non-contact recording system which comprises a light projecting head which projects a beam of light onto a recording medium which is a light sensitive sheet. This recording apparatus requires a dark room in which the exposed light sensitive sheet is developed and fixed chemically. Moreover, the use of the light sensitive sheet for the recording medium often constitutes a cause for an increase of the operating cost.

Liquid jet recording systems are known, and may be classified into two types according to the manner by which a jet of liquid ink is produced: One type is disclosed in U.S. Pat. Nos. 2,600,129 and 3,060,429, respectively patented on June 10, 1952 and on Oct. 23, 1962, and includes, as shown in FIGS. 1 and 2, supplying liquid ink from an ink reservoir 1 to a nozzle 3 so as to form a meniscus at the exit end of nozzle 3 by the use of a suitable pressure applying means (not shown), applying between the nozzle 3 and a ring electrode 4 coaxially spaced from the nozzle 3 a high voltage DC power or a high voltage DC pulse signal superposed with a high voltage DC power, respectively from a high voltage DC power source 6 or a combination of a high voltage DC power source 6 and a high voltage pulse genertor 7, so that droplets of liquid ink can be expelled successively from the exit end of the nozzle 3 towards a recording medium. Particularly, in the method shown in FIG. 2, the frequency of formation of the droplets is synchronized with the frequency of the high voltage DC pulse signal generated by the high voltage pulse generator 7.

The other type of known system is disclosed in U.S. Pat. No. 3,596,275, patented on July 27, 1971, and is such that, as shown in FIG. 3, liquid ink from the ink reservoir 1 is, after having been pressurized to several kg/cm$^2$, for example, 4.2 kg/cm$^2$, by a pressure applying means 2', expelled towards a recording medium. In this method, if an ultrasonic vibrator 9 coupled to the nozzle 3 is oscillated by an oscillator 10 positioned outside the ultrasonic vibrator 9 and electrically connected therewith, the frequency of formation of droplets to be jetted becomes synchronized with the frequency of the oscillation of the ultrasonic vibrator 9 which is, for example, 100 KHz.

Printers, recorders and facsimile recorders practicing either of the foregoing methods have heretofore been known. In those devices wherein the first mentioned system is employed, deflection electrodes are provided between the ring electrode and the recording medium for controlling the electric field, established between the deflection electrodes, in response to an intelligence signal from an intelligence signal source to enable the intelligence signal to be recorded on the recording medium. On the other hand, in those devices wherein the second mentioned system is employed the ring electrode acts as a charging electrode for controlling the electrostatic charge, carried by droplets to be jetted, in response to intelligence signals from an intelligence signal source, so that the direction of travel of the droplets can be controlled as they pass through a space between the deflection electrodes.

SUMMARY OF THE INVENTION

The present invention also pertains to a liquid jet recording apparatus wherein a liquid jet recording system according to any of the foregoing known methods is effectively applied to a device, such as an X-Y plotter, wherein information is delineated on a recording medium while the recording medium and a recording head undergo relative motion and, more particularly, to such a liquid jet recording apparatus capable of delineating a line of uniform width, quality and density even if the recording speed varies and also the physical characteristics of liquid ink vary depending upon, for example, variation of external factors such as temperature and humidity.

Accordingly, an essential object of the present invention is to provide an improved recording apparatus employing a liquid jet recording head, thereby to eliminate substantially the disadvantages of prior art systems.

Another object of the present invention is to provide an improved recording apparatus of the type referred to above, wherein there is provided means for simply adjusting the density of ink deposit forming a delineated line on the recording medium.

A further object of the present invention is to provide an improved recording apparatus of the type referred to above, wherein there is provided means for varying the number of droplets to be jetted from the recording head towards the recording medium in response to variation of the relative speeds of movement of the recording head and recording medium so that a line of uniform line width can be drawn or delineated on the recording medium.

A still further object of the present invention is to provide an improved recording apparatus of the type referred to above, wherein the recording head does not require the use of electric parts having a relatively high voltage withstanding characteristic.

A still further object of the present invention is to provide an improved recording apparatus of the type referred to above, wherein there is provided means for improving the frequency of droplets of liquid ink to be successively jetted and for the droplets to be jetted in a stabilized manner.

BRIEF DESCRIPTION OF THE DRAWINGS

These and other features of the present invention will be readily understood from the following description taken in conjunction with preferred embodiments thereof with reference to the accompanying drawings, in which:

FIGS. 1 through 3 are schematic diagrams showing respective conventional liquid jet recording systems, any of which are employable with the various features of the present invention;

FIG. 4 is a schematic block diagram illustrating certain features of the present invention;

FIGS. 5(*a*) and (*b*) are schematic diagrams showing the sequential formation of a droplet of liquid ink;

FIG. 23(*b*) is a chart illustrating output wave forms in the arrangement of FIG. 23(*a*);

FIG. 24(*b*) is a chart illustrating output waveforms in the arrangement of FIG. 24(*a*);

DETAILED DESCRIPTION OF THE INVENTION

Figure 6:
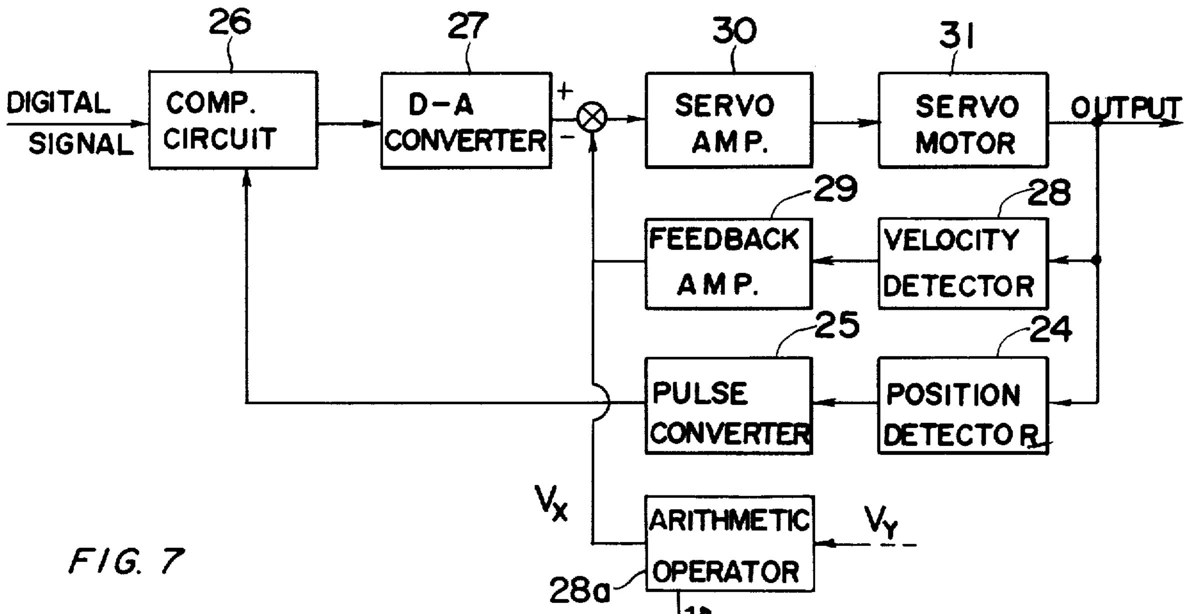
FIG. 6 is a schematic block diagram showing a digital servo system utilizing a servo motor.

Before the description of the present invention proceeds, it should be noted that like parts are designated by like reference numerals throughout the accompanying drawings.

Referring first to FIG. 4, it will be seen that the liquid jet recording apparatus shown in FIG. 4 employs the system of FIG. 2 and is designed such that liquid ink is supplied from the ink reservoir 1 to the nozzle 3 by the use of a suitable pressure applying means (not shown) in such a manner as to form a meniscus M at the exit end of the nozzle 3. The nozzle 3 is adapted to receive an electric voltage that is a high DC voltage from the high voltage DC power source 6 having been superposed with a pulse signal fc generated by a clock pulse oscillator 18 and having been amplified by an amplifier 19.

Upon application of the electric voltage to the nozzle 3, droplets of liquid ink are successively expelled from the exit end of the nozzle 3 towards a recording medium P in such a manner as shown in FIGS. 5(*a*) and (*b*) in synchronization with the clock pulse. It should be noted that in FIG. 5(*b*), reference character M' represents a convex meniscus.

Between the ring electrode 4 and the recording medium P, there is provided a pair of oppositely spaced deflection electrodes 12 and 13 and a gutter 15. The deflection electrodes 12 and 13 act, upon application of pulse voltage from the pulse source thereto, to deflect the path of travel of a jet of liquid ink so that the latter can be collected by the gutter 15. So long as no pulse voltage is applied to the deflection electrodes 12 and 13, droplets forming the jet of liquid ink successively travel towards the recording medium P. The deflection electrode 12 is adapted to receive a DC bias voltage from a deflection bias power source 14.

The clock pulse oscillator 18 feeds a pulse signal to a frequency demultiplier 20 which is substantially composed of a flip-flop circuit and which acts to demultiply the pulse signal to a predetermined frequency *fc* corresponding to a desired density of liquid ink to be used to draw a line. The frequency demultiplier 20 in turn feeds an output signal of frequency *fc* to a delay circuit 21 by which such output signal is delayed for a duration corresponding to the time required for the droplets, that have been expelled from the nozzle 3 in synchronization with the pulse signal fc applied to nozzle 3, to enter the space between the deflection electrodes 12 and 13. The delayed signal is then fed from the delay circuit 21 to a high voltage amplifier 22 and, after having been amplified by the amplifier 22, it is fed to the deflection electrode 13 thereby cancelling a potential difference between the deflection electrodes 12 and 13 that has been created by the DC bias voltage applied to the deflection electrode 12.

Accordingly, when the pulse signal *fc* of demultiplied frequency is applied to the deflection electrode 13, the droplets of the liquid ink are successively jetted towards the recording medium P without being attracted by the deflection electrode 13 towards the gutter 15. On the other hand, if no pulse signal *fc* is applied to the deflection electrode 13, the droplets of the liquid ink are successively attracted towards the gutter by the voltage applied to the deflection electrode 12.

Instead of the foregoing system wherein the potential difference created between the deflection electrodes 12 and 13 by applying DC voltage to the deflection electrode 12 has been described as cancelled, an alternate system may be one wherein a deflection electric field is established between the deflection electrodes 12 and 13 by directly applying pulse signals. By way of example, if the pulse width of the pulse signals is adjusted such as to permit each pulse signal to control one droplet of the liquid ink, the foregoing embodiment will be such that the density of ink deposits used to draw a line can be easily selected merely by varying the rate of demultiplication of the frequency demultiplier 20.

Although in the foregoing arrangement of FIG. 4 the recording head has been described as employing the system shown in FIG. 2, a recording head employing the system of FIG. 1 or a recording head employing the system of FIG. 3 wherein droplets of liquid ink pressurized by the pressure applying means are successively expelled by the vibrator 9 oscillated by the oscillator 10 may equally be applicable.

The following embodiment shown in FIGS. 6 to 10 is how the frequency of pulse voltage to be applied to the deflection electrodes employed in the recording apparatus of FIG. 4, which as stated above may employ any of the systems of FIGS. 1-3, is controlled by the detection of a relative velocity of movement of the recording head and recording medium. In other words, the recording apparatus according to the following arrangement is advantageously applicable to an X-Y plotter or any other device wherein, while the recording head and the recording medium undergo relative motion, the recording head operates in response to an external signal so as to draw a pattern on the recording medium.

Application of the recording apparatus according to the following arrangement is advantageous in that no substantial noise is generated even though the apparatus operates at a relatively high speed. In addition, there can be provided a recording apparatus capable of drawing a line of uniform line width and uniform ink deposit merely by causing the droplets of liquid ink in a number proportional to the relative velocity of the recording head and the recording medium to arrive to the recording medium.

In the recording apparatus according to the following arrangement, any of an analogue servo system and a digital servo system can be employed as a system for positioning the recording head. However, for better understanding of the present invention, the recording apparatus will now be described as applied with a digital servo system of the type wherein analogue servo motors having a feedback circuit for the speed is employed.

FIG. 6 illustrates a block diagram of the servo system for positioning the recording head in the X or Y axis and, in practice, the X-Y plotter employs two servo systems, each of the arrangement shown in FIG. 6, for the X and Y axes, which cooperate with each other to drive the recording head.

Referring now to FIG. 6, the servo system operates in the following manner. If a digital signal, for example, indicative of the number of pulses representing the distance of movement of the recording head is, as an input signal, applied to a comparison circuit 26, a position detector 24 detects the distance of movement of the recording head and generates an output signal indicative of the distance of movement of the recording head to a pulse converter 25. The pulse converter 25 upon receipt of the output signal from the position detector 24 converts the output signal into a digital signal, for example, indicative of the number of pulses corresponding to the distance of travel of the recording head, which is in turn fed back to the comparison circuit 26. The comparison circuit 26 then acts to compare the fedback digital signal with the digital signal and then generates a signal indicative of the difference between the number of the pulses of the fedback digital signal and the number of the pulses of digital signal, which signal from the comparison circuit 26 is in the form of a digital signal indicative of a direction of movement of the recording head. In other words, with the digital signal from the comparison circuit 26, depending upon whether the difference between the number of the pulses of the fedback digital signal and the number of the pulses of the digital signal fed to the comparison circuit 26 is negative or positive, the direction of movement of the recording head can be changed.

The digital signal from the comparison circuit 26 is then fed to a digital-analogue converter 27 so that the digital signal received thereby can be converted into an analogue signal, for example, voltage. The analogue signal from the converter 27 is, after having been amplified by a servo amplifier 30, fed to a servo motor 31 to drive the latter so that the recording head can be transported to a target position.

On the other hand, a velocity detector 28 of the servo system acts to detect the relative velocity v of movement of the recording head and recording medium in the form of a voltage Vx representative of the velocity of movement of the recording head in the direction of the X-axis and a voltage Vy representative of the velocity of movement of the recording head in the direction of the Y-axis. An output from the detector 28 is, after having been amplified by a feedback amplifier 29, fed to the servo amplifier 30 after having been subtracted from the analogue signal from the converter 27, so that the relative velocity of movement of the recording head and recording medium can be stabilized.

Figure 7:
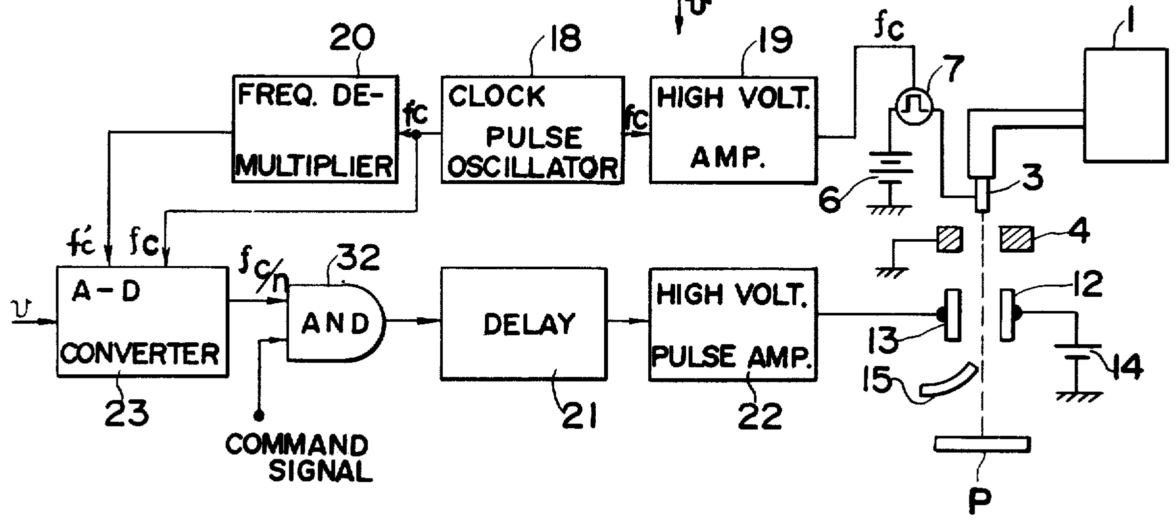
FIG. 7 is a schematic block diagram showing a particular embodiment of the present invention, which is applicable with the digital servo system of FIG. 6.

In the recording apparatus according to the following description, the voltages Vx and Vy respectively representative of the velocities of movement of the recording head in the directions of the X and Y axes are subjected to an arithmetic operation by an arithmetic operator 28a to obtain a signal of a voltage $v = \sqrt{Vx^2 + Vy^2}$ which is in turn applied to an analogue-digital converter 23 shown in FIG. 7 so that droplets of liquid ink that have successively been jetted towards the recording medium can be quantified and varied to enable the recording head to draw a line of constant ink density.

Figure 8:
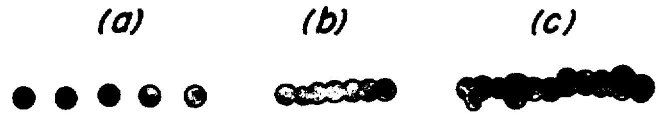
FIGS. 8(*a*), (*b*) and (*c*) are schematic diagrams illustrating different types of ink deposits, which are utilized to describe a relationship between the relative velocity of movement of the recording head and recording medium and the frequency of successive droplets jetted towards the recording medium.

Referring now to FIG. 8, there are shown three types of ink deposits formed by a liquid jet recorder. FIG. 8(*a*) illustrates a condition wherein the relative velocity of movement of the recording head and recording medium is relatively high, FIG. 8(*b*) illustrates a condition wherein the relative velocity is adequate, and FIG. 8(*c*) illustrates a condition wherein the relative velocity is too low. Since the frequency of the droplets jetted is of a relatively high speed, the employment of the liquid jet recording head in the conventional X-Y plotter would not result in the condition of FIG. 8(*a*). However, when the recording head starts or stops its movement, the relative velocity of movement of the recording head and recording medium tends to become low and, accordingly, in the case where the recording medium is employed in the form of a sheet of polyester or like sheet having a poor moisture absorbability, excessive ink will be deposited such as shown in FIG. 8(*c*), the result of which is not visually satisfactory. This sort of disadvantage can be effectively avoided according to the present invention.

Referring now to FIG. 7, the recording apparatus shown is applicable to an X-Y plotter having the servo system shown in FIG. 6.

As hereinbefore described in conjunction with the foregoing arrangement, the recording apparatus comprises a basic construction including the ink reservoir 1, the nozzle 3, the high voltage DC power source 6 and the ring electrode 4. The recording apparatus further comprises the deflection electrodes 12 and 13, the deflection bias power source 14, the gutter 15 and the recording medium P supported in position so as to move relative to the recording head and below the exit end of the nozzle 3. The arrangement so far described operates in synchronism with the frequency fc of the clock pulse oscillator 18 in such a manner that the droplets of liquid ink are successively transferred to the recording medium P in synchronism with a positive pulse voltage of frequency fc from the high voltage amplifier 19 that has been superposed with the high voltage DC power from the power source 6 which is applied to the nozzle 3. The droplets of the liquid ink are, when no signal is applied to the deflection electrode 13 from the high voltage pulse amplifier 22, deflected towards the gutter 15 by the action of the uniform electric field established between the electrodes 12 and 13 while the deflection bias power is applied to the deflection electrode 12 from the power source 14. It should be noted that each of the droplets jetted carries an electric charge. Therefore, the droplets are not jetted towards the recording medium, but are collected by the gutter 15.

On the contrary thereto, when the high voltage pulse amplifier 22 receives an input signal from the delay circuit 21, the output is designed such as to generate a pulse of positive polarity having an amplitude substantially equal to the voltage of the deflection bias power source 14 and, accordingly, at this time, the electric field that has been established between the deflection electrodes 12 and 13 is removed thereby permitting the droplets of the liquid ink to be jetted from the nozzle 3 to the recording medium P without being deflected. The width of the pulse used to remove the electric field between the deflection electrodes 12 and 13 is such that a single pulse can remove one droplet of the liquid ink.

Figure 9:
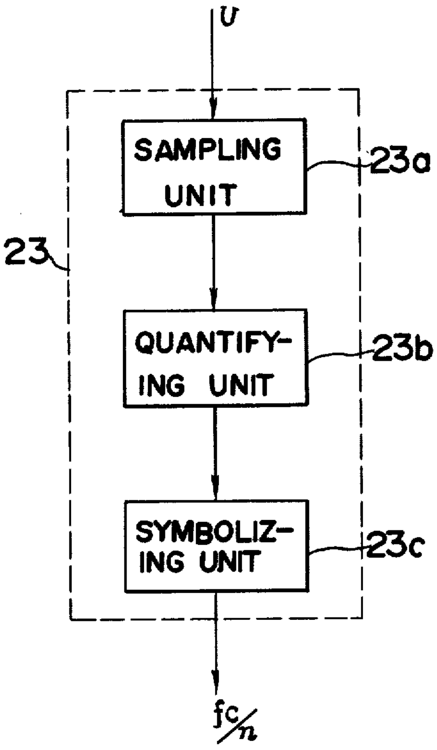
FIG. 9 is a schematic block diagram showing an analogue-digital converter employed in the circuit of FIG. 7.

A method of obtaining this pulse will now be described. As hereinbefore described, the voltage v proportional to the velocity of movement of the recording head is applied from arithmetic operator 28a to the analogue-digital converter 23. The converter 23 comprises, as shown in FIG. 9, a sampling unit 23a, a quantifying unit 23b and a symbolizing unit 23c. The sampling unit of the converter 23 is sampled by the signal $f'c$, which corresponds to the clock pulse fc of which frequency has been demultiplied by the frequency demultiplier 20 composed of the flip-flop circuit, and performs sampling subject to the voltage v, as shown in FIG. 10(*a*), at intervals of a time of $1/f'c$ as shown in FIG. 10(*b*).

Figure 10:
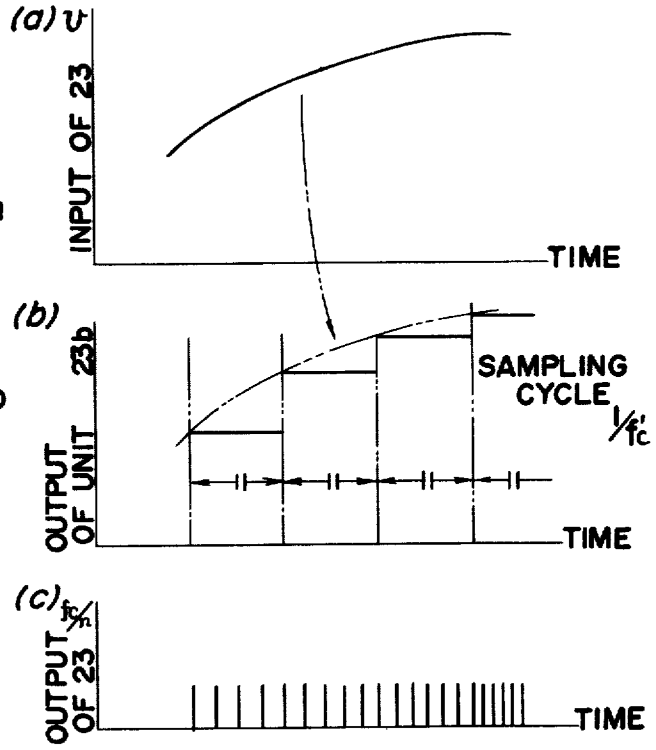
FIG. 10 is used to describe the relation between the input and output of the analogue-digital converter of FIG. 9, wherein FIG. 10(*a*) illustrates a graph showing a signal indicative of the line transfer speed, FIG. 10(*b*) illustrates a graph showing the signal indicative of the line transfer speed that has been sampled, and FIG. 10 (*c*) illustrates a graph showing the signal indicative of the line transfer speed that has been digitalized.

The voltage v that has been sampled by the sampling unit 23a is converted into a train of pulses, as shown in FIG. 10(*c*), of a frequency of $fc/n$, wherein n is a positive number (as 1, 2, 3 . . . ), that is, converted into $n \propto 1/v$, by the quantifying unit 23b and then by the symbolizing unit 23c. Accordingly, an output from the analogue-digital converter 23 is a train of pulses of which frequency is proportional to the velocity of the movement of the recording head, the value of which frequency is quantified to a fraction of the frequency fc of the droplets jetted.

The pulse train thus emerging from the converter 23 is then fed to an AND gate 32. The AND gate 32 is, upon receipt of a command signal indicative of start of movement of the recording head, triggered on to pass the pulse train therethrough in a number corresponding to the duration of the command signal. Pulses emerging from the AND gate 32 are then fed to the delay circuit 21. As hereinbefore described, the delay circuit 21 acts to delay the pulses for a period of time, for example, in the order of some millisecond, corresponding to the time required for the droplets expelled from the nozzle 3 to enter the space between the deflection electrodes 12 and 13. The delayed pulses from the delay circuit 21 are, after having been amplified by the high voltage pulse amplifier 22, applied to the deflection electrode 13 to thereby remove the electric field that has been established between the deflection electrodes 12 and 13.

From the foregoing, it has now become clear that the droplets of the liquid ink that have been successively jetted from the nozzle 3 towards the recording medium P are each adjusted so as to be thinned and deposited on the recording medium P.

Although in the foregoing arrangement, the present invention has been described as applied to a recording apparatus having a velocity feedback system, it can be equally applicable to a recording apparatus having no velocity feedback system if an arrangement is employed to detect the velocity of the recording head in any known manner. In addition, in the case where the present invention is to be applied to a recording apparatus utilizing pulse controlled motors, since the frequency of input pulses applied to the pulse controlled motors is proportional to the velocity of movement of the recording head, application of the recording apparatus to such a recording apparatus as having X and Y axes requires the pulse frequency associated with the X and Y axes to be converted into analogue values in order to obtain the voltage v as hereinbefore described or to be completely digitally treated.

The arrangement shown in FIGS. 6 to 10 is particularly advantageous in that, since the pulse signal utilized to vary the line width in the arrangement of FIG. 4 is controlled by the signal indicative of the velocity of movement of the recording head, a line of not more than 0.2 mm. in width can be drawn at a relatively high speed and in that manufacture and maintenance of the recording apparatus are both inexpensive.

A further feature of the present invention is designed such that, for example where the liquid jet producing system to be used in the liquid jet recording apparatus is of the type as shown in FIG. 1, the frequency of the droplets jetted can be improved to a relatively high value while the droplets can be jetted in a highly stabilized manner. In order to facilitate a better understanding of this embodiment of the present invention, description will first be made in connection with how a jet of droplets of liquid ink can be formed.

Figure 11:
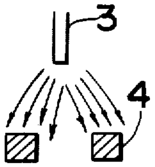
FIG. 11 is a schematic diagram showing an electric field established between the nozzle and the ring electrode in the arrangement of FIG. 1.

Referring back to FIG. 1, liquid ink from the ink reservoir 1 is pressurized by a suitable pressure applying means (not shown) and introduced to the exit end of the nozzle 3 to form the meniscus M such as shown in FIG. 5. The ring electrode 4 is positioned coaxially with the nozzle 3 and in spaced relation to nozzle 3 and, when a high voltage DC power $V_1$ is applied from the high voltage DC power source 6 between the nozzle 3 (or the liquid ink in the case where the nozzle 3 is made of electrically non-conductive material) and the ring electrode 4, an electric field is established between the nozzle 3 or the liquid ink and the ring electrode 4 in such a manner as shown in FIG. 11, by which the liquid ink is, in the form of droplets, attracted from the exit end of the nozzle towards the recording medium P.

Figure 12:
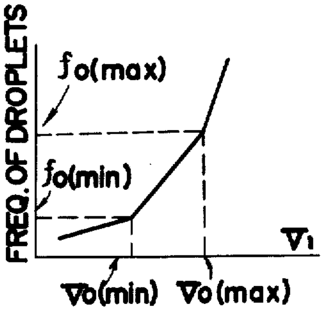
FIG. 12 is a graph showing a relationship between the applied voltage and the frequency of successive droplets to be jetted.
Figure 13:
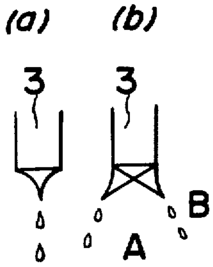
FIGS. 13(*a*) and (*b*) are schematic diagrams showing different manners of formation of droplets to be jetted towards the recording medium.

When it comes to a relationship between the high voltage DC power $V_1$ and the frequency of droplets of liquid ink jetted, increase of the high voltage DC power $V_1$ to a value *Vo* (min) as shown in FIG. 12 results in the ink jet in a bundled configuration and, as shown in FIG. 13(*a*), convex and concave menisci of the liquid ink respectively shown in FIG. 5 and FIG. 13(*a*) are alternately formed at the exit end of the nozzle 3 and, during each cycle of the alternate formation of the menisci in different shapes, a fine droplet of the liquid ink is expelled and jetted at a relatively high speed towards the recording medium. The frequency of the droplets jetted at this time is assumed to be fo(min).

Further increase of the high voltage DC power $V_1$ to a higher value V*o*(max) results in the jet of liquid ink travelling in an unstable manner and, as shown in FIG. 13(*b*), unfavorable shaking motion takes place in the menisci at the exit end of the nozzle 3 in such a manner that shapes of the menisci alternately vary as indicated by A and B. The frequency of the droplets jetted at this time is assumed to be *fo*(max).

It has been considered that a cause of such shaking motion of the menisci is traced to the electric field established between the nozzle 3 and the ring electrode 4 being in a substantially conical shape and acting on each of the droplets expelled from the nozzle 3.

It should be noted that, though the jet of the liquid ink can be jetted in a stabilized manner if the high voltage DC power $V_1$ is within the range of from V*o*(min) to V*o*(max), the frequency of the droplets jetted increases in proportion to an increase of the high voltage DC power $V_1$ within that range.

In the case where a liquid jet producing system of the foregoing arrangement is to be applied to a printer or a plotter, high speed performance and stabilized stream of the liquid ink jet are desired. However, once the size of the nozzle 3 used and the physical characteristics, such as surface tension, viscosity and others, of the liquid ink used have been fixed, the following two methods can be contemplated to improve the frequency of the droplets jetted: One of these methods is to reduce the pressure acting on the ink at the exit end of the nozzle and then to reduce the mass of the liquid ink in a portion of the nozzle where vibrations are applied, and the other method is to increase the high voltage DC power $V_1$.

However, although the former method is advantageous in that *fo*(min) and *fo*(max) can be both increased by reducing the pressure, it has a disadvantage in that the value of V*o*(max)-V*o*(min) is reduced and, accordingly, *fo*(max)-*fo*(min) is also reduced thereby increasing instability. The reason therefor is a fact found during an experiment and the manner of travel of a jet of liquid ink is well similar to a vibration occurring in a spring element in relation to its mass. Therefore, if the mass of the liquid ink at the portion of the nozzle where vibrations are applied is reduced, the intrinsic frequency of the system increases.

Reduction of the pressure acting on the meniscus means reduction of the size of the meniscus, that is, reduction of the mass and, therefore, the frequency of vibrations, *fo*(min) and *fo*(max) are increased.

In the latter method, since there exists an upper limit of V*o*(max), the high voltage DC power $V_1$ can not be carelessly increased.

The present invention has been made on the basis of the foregoing fact finding and the subsequently described feature thereof is intended to, while the physical values of the liquid ink used, the inner diameter of the nozzle and the pressure acting on the ink at the exit end of the nozzle are all fixed, increase the maxium flux voltage V*o*(max) to improve the maximum flux frequency *fo*(max) of the droplets to be jetted and also to enlarge the range of V*o*(max)-V*o*(min). This is particularly advantageous in that high speed performance and stabilized ink jet can be appreciated.

Figure 15:
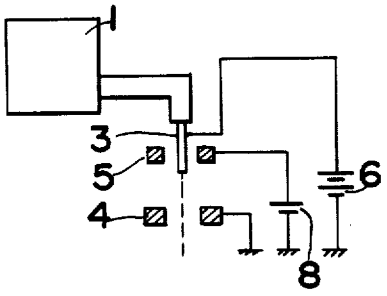
FIG. 15 is a schematic diagram illustrating a specific arrangement of the present invention, in which the shielding electrode shown in FIG. 14 is employed.

Referring now to FIG. 15, it will be readily seen that, while the construction shown includes all the elements shown in FIG. 1, a shielding electrode 5 in the form of a ring is arranged between the nozzle 3 and the ring electrode 4 in coaxially spaced relation thereto, which shielding electrode 5 is electrically connected to a bias power source 8 so as to receive a bias potential $V_2$.

Figure 14:
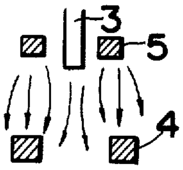
FIG. 14 is a schematic diagram showing an electric field established between a shielding electrode and the ring electrode according to a further feature of the present invention.

Accordingly, by the presence of the shielding electrode to which the bias potential $V_2$ is applied, the electric field established between the nozzle 3 and the ring electrode 4 is, as shown in FIG. 14, restricted and shielded and, consequently, no substantial shaking motion takes place in the menisci even if the maximum flux potential $Vo$(max) is increased to increase the maximum flux frequency $fo$(max) of droplets to be jetted.

The position of the shielding electrode 5 has to be selected such that the electrical field established between the nozzle 3 and the ring electrode 4 is not hampered.

Figure 16:
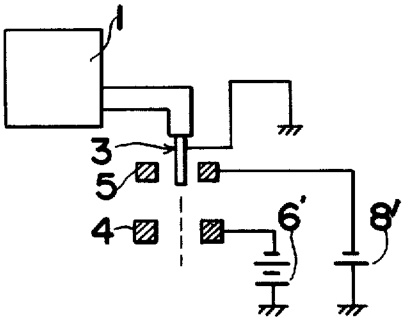
FIG. 16 is a modification of the arrangement of FIG. 15.

FIG. 16 illustrates a modification of the arrangement of FIG. 15 and is substantially identical thereto so far as the potential to be applied and the electric field are concerned, except that the power source is connected in reversed polarity. In other words, the ring electrode 4 is adapted to receive a negative potential from the power source 6' while the shielding electrode 5 is adapted to receive a negative potential from the power source 8'. Even this modified arrangement satisfactorily functions in substantially the same manner as the arrangement of FIG. 15.

In practice, in order to find an effectiveness of the provision of the shielding electrode 5, a series of experiments have been conducted in such a manner that while the bias potential $V_2$ was fixed to be zero, values of $Vo$(min), $Vo$(max), $fo$(min) and $fo$(max) were measured by varying the distance between the nozzle 3 and the shielding electrode 5. The results are shown in the graph of FIG. 17(*b*) and it will be readily understood that, if the shielding electrode 5 is employed such as shown in FIGS. 15 or 16, the values of $Vo$(min), $Vo$(max) and $Vo$(max)-$Vo$(min) are each increased and, accordingly the values of $fo$(min) and $fo$(max) increase.

Figure 17:
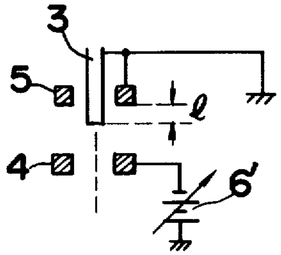
FIGS. 17(*a*) and (*b*) are a schematic diagram showing the position of the shielding electrode and a graph showing a relationship between the applied voltage and the frequency of successive droplets jetted, respectively.
Figure 17:
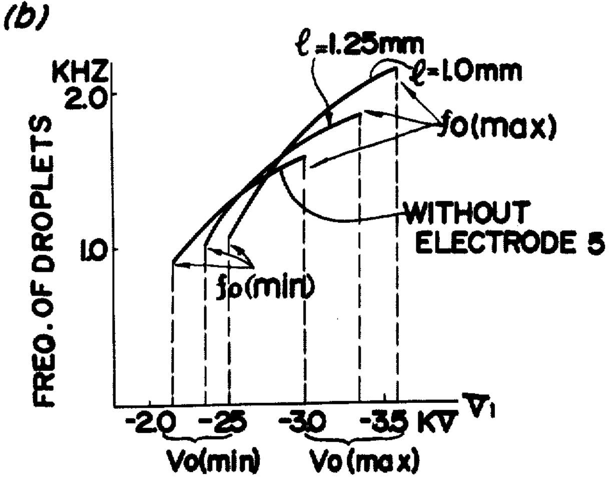

In other words, the frequency of droplets jetted upon application of the applied voltage $V_1$ is considerably upwardly shifted to the right of the graph of FIG. 17(*b*) as compared with that achieved without using the shielding electrode, with considerable increase of the value of $fo$(max).

Figure 18:
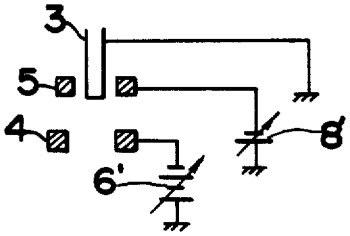
FIGS. 18(*a*)-(*c*) illustrate relationships between the bias voltage and the applied voltage or the frequency of successive droplets jetted relative to a particular position of the shielding electrode.
Figure 18:
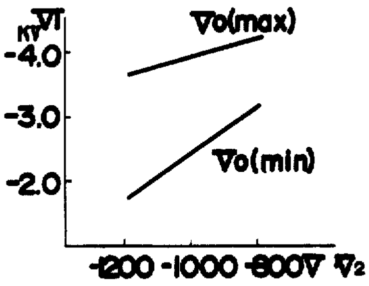
Figure 18:
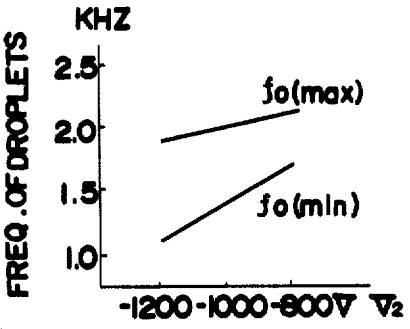

FIG. 18 illustrates results of another series of experiments conducted subject to the arrangement of FIG. 16 in such a manner as to measure the values of $Vo$(min), $Vo$(max), $fo$(min) and $fo$(max) available while the bias potential $V_2$ applied from the bias power source 8' to the shielding electrode 5 mounted in such a manner that one of the opposed annular end faces of electrode 5 facing the ring electrode 4 rested on the same plane as the exit end of the nozzle 3 is varied in such a manner as shown in FIG. 18(*a*). It should be noted that, when the shielding electrode 5 was removed, $Vo$(min) was $-2.2$ Kv, $Vo$(max) was $-2.6$ Kv, the absolute value of $Vo$(max)-$Vo$(min) was 400 V, $fo$(min) was 1.3 KHz and $fo$(max) was 1.5 KHz.

As can be understood from FIGS. 18(*b*) and (*c*), if a potential $V_2$ of, for example, $-1{,}200$V is applied to the shielding electrode, the absolute value of $Vo$(max)-$Vo$(min) and $fo$(max) become 2.0 Kv and 1.9 KHz, respectively, and therefore the high speed performance and the stability can be improved considerably as compared with the arrangement wherein no shielding electrode is provided. Moreover, if the bias potential $V_2$ is further increased to intensify the electric field between the shielding electrode 5 and the ring electrode 4, $fo$(max) can be increased in proportion to the value of $V_2$ thereby improving the high speed performance although the stability is slightly reduced, but remains improved as compared with the arrangement wherein no shielding electrode is provided.

From the foregoing description, it has now become clear that the use of the shielding electrode for restricting and shielding the electric field established between the nozzle and the ring electrode results in improvement of the maximum flux voltage $Vo$(max) thereby to increase the maximum frequency $fo$(max) of the droplets jetted without any accompanying shaking motion which may otherwise occur in the menisci at the exit end of the nozzle. In addition, $Vo$(max)-$Vo$(min) has also been increased and, consequently, the jet of the liquid ink travelling towards the recording medium can be stabilized in a relatively wide range with high frequency of the droplets jetted at a relatively high speed.

Shielding electrode 5 may also be employed with a system such as that of FIG. 2 and may be used in conjunction with the arrangement of the invention shown in FIG. 7.

A method by which, in the arrangement of FIG. 2, uniformly sized droplets of the liquid ink to be jetted can be formed will now be described.

Figure 19:
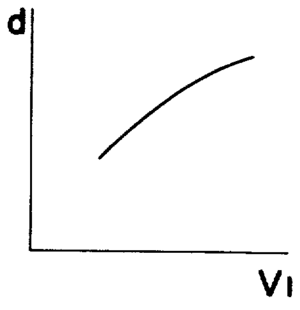
FIG. 19 is a graph showing a relationship between the voltage $V_1$ of the high voltage power source and the diameter of each of the droplets formed in the arrangement of FIG. 2.
Figure 20:
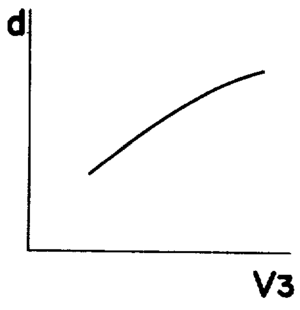
FIG. 20 is a graph showing a relationship between the amplitude $V_3$ of the high voltage pulse source and the diameter of each of the droplets formed in the arrangement of FIG. 2.
Figure 21:
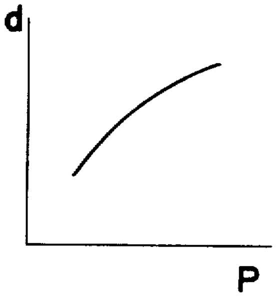
FIG. 21 is a graph showing a relationship between the pressure P generated by the pressure applying means and the diameter of each of the droplets formed in the arrangement of FIG. 2.

In the case of the arrangement of FIG. 2, a relationship between the diameter $d$ of each of the droplets formed and the voltage $V_1$ applied from the high voltage DC power source 6, a relationship between the diameter of each of the droplets formed and the amplitude $V_3$ of the pulse voltage applied from the pulse generator 7 and a relationship between the diameter $d$ of each of the droplets formed and the pressure P of the liquid ink at the exit end of the nozzle 3 are such as shown in FIGS. 19 to 21, respectively. From the graphs of FIGS. 19 to 21, it will be seen that once variation occurs in the voltage $V_1$, the pressure P, etc., the diameter $d$ of the droplet varies accordingly and, by this reason, if such an ink jet producing system as shown in FIG. 2 is employed in a printer, indistinct images will result, or if it is employed in an X-Y plotter or a like device designed so as to draw a particular image, a drawn line will be uneven in line width and ink deposit.

Accordingly, the following provision of the present invention have been made to eliminate these disadvantages. More specifically, the present invention so far as the following features are concerned, has been made on the basis of the discovery that the electric charge carried by each of the droplets expelled from the exit end of the nozzle more or less affects the diameter $d$ of each droplet and is structurally designed such that the amount of electric charge carried by each droplet, which is detected, is used to control the high voltage DC power source, the high voltage pulse generator and the pressure applying means so as to form the droplets of uniform diameter.

Figure 22:
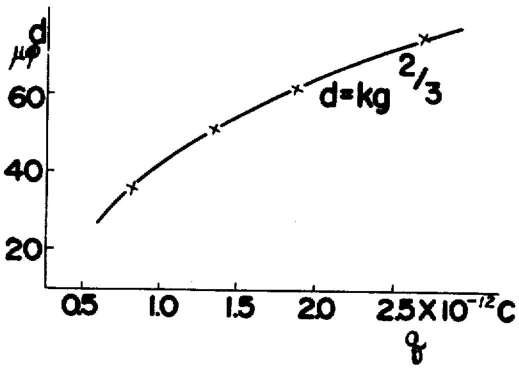
FIG. 22 is a graph showing a relationship between the electric charge q carried by the droplets and the diameter d of each droplet.

Referring now to FIG. 22, there is illustrated a relationship between the electric charge $q$ carried by each of the droplets of liquid ink and the diameter $d$ thereof, which provides a basis for this portion of the present invention. From the graph of FIG. 22, it will be seen that the diameter $d$ of the droplet is determined by the balance between a force acting to compress the surface of the droplet by means of the surface tension thereof and a force acting to expand the same droplet by means of the density of electric charge in the surface of the same droplet and, if the amount of electrical charge in the droplet is assumed to be $q$, can be expressed by the following equation: $d = Kq^{2/3}$, wherein $K$ is a constant determined by the physical characteristics of the liquid ink used.

Figure 23:
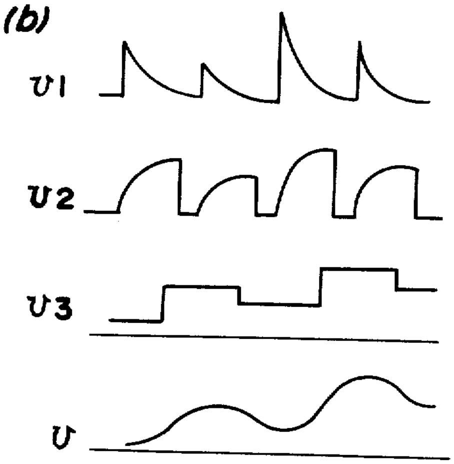
FIG. 23(*a*) is a schematic diagram of one type of detector for detecting the electric charge carried by each droplet.
Figure 23:
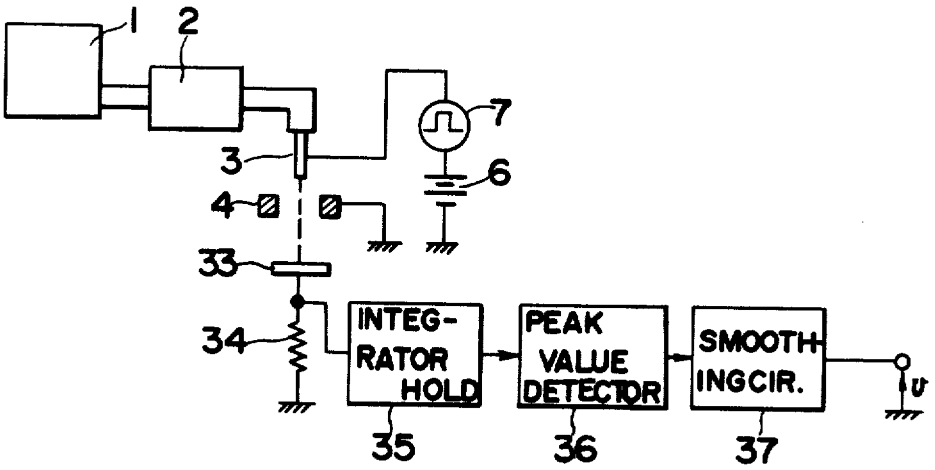
Figure 24:
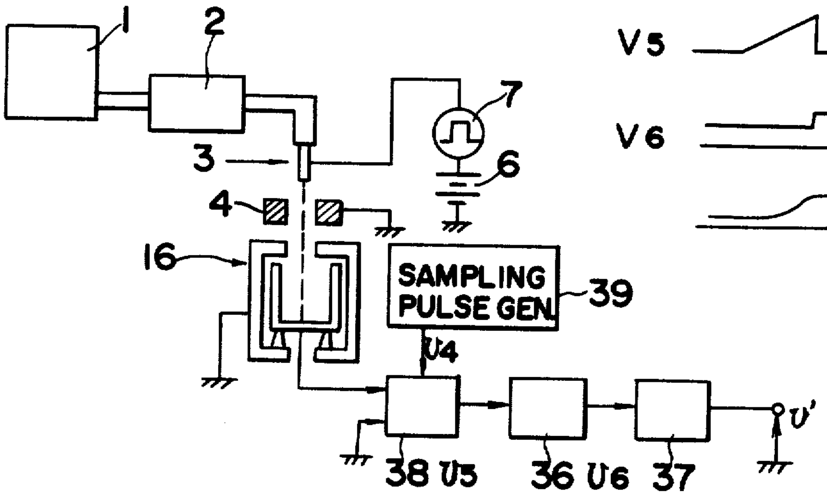
FIG. 24(*a*) is a schematic diagram of a modified type of detector for detecting the electric charge carried by the droplets.
Figure 24:
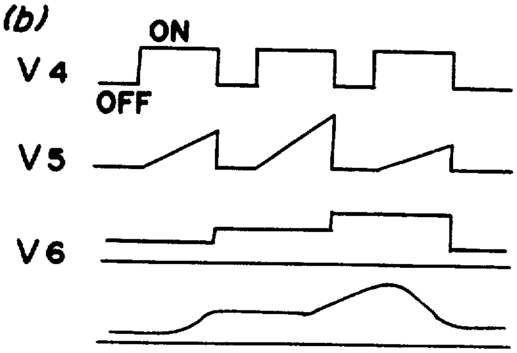

FIGS. 23 and 24 illustrate how the electric charge $q$ has been measured from each of the droplets jetted according to the present invention.

Referring first to FIG. 23, in order to detect the amount of the electric charge carried by each droplet, a collector electrode 33 is arranged on one side of the ring electrode 4 opposite to the nozzle 3, which collector electrode 33 is connected electrically to the ground through a discharge resistor 34. In the case where any noise is anticipated, paths other than the path of travel of the liquid ink jet may be shielded.

Therefore, if electrically charged droplets of the liquid ink impinge upon the collector electrode 33, the electrical charge carried by each of the droplets is discharged to the ground through the discharge resistor 34 and, at this time, voltage of a waveform $V_1$ appears across the resistor 34 as shown in FIG. 23(*b*).

The collector electrode 33 is also electrically connected to an integrator hold circuit 35 which acts to integrate the voltage of the waveform $V_1$ and then to hold the peak value thereof. It is to be noted that this integrator hold circuit 35 is reset after the peak value has been held and prior to impingement of the next succeeding droplet upon the collector electrode 33. Accordingly, an output from this integrator hold circuit 35 has a waveform $V_2$ shown in FIG. 23(*b*), the peak value thereof being a value proportional to the electric charge $q$.

The integrator hold circuit 35 is in turn electrically connected to a peak value detector 36 which acts to retain the peak value of output $V_2$ from the integrator hold circuit 35 and generates an output signal of a waveform $V_3$ as shown in FIG. 23(*b*) to a smoothing circuit 37. The smoothing circuit acts to smooth the output signal $V_3$ from the peak value detector 36 and to generate an output signal of a waveform V as shown in FIG. 23(*b*) which is proportional to the electric charge $q$.

FIG. 24 illustrates an example where a Faraday cage is utilized to detect the amount of electric charge $q$ carried by each droplet of the liquid ink jetted. In this arrangement, the Faraday cage 16 is positioned on one side of the ring electrode 4 opposite to the nozzle 3 and in alignment with the nozzle, an output terminal of which Faraday cage is electrically connected to an electrometer 38 capable of measuring a relatively small electricity. It is to be noted that the electrometer 38 is alternately set and reset at a predetermined interval of time by a sampling pulse generator 39. Accordingly, during which a sampling signal $V_4$ generated from the sampling pulse generator 39 is in an ON state as shown in FIG. 24(*b*), the electrometer 38 is operated to generate an output signal $V_5$ of a waveform as shown in FIG. 24(*b*), the peak value of which output signal $V_5$ represents the integrated value of electric charge of the droplets that have been received by the Faraday cage 16 during the duration of the ON state of the sampling pulse. In other words, the peak value of the output signal $V_5$ has to be proportional to the average value of the electrical charges carried by the droplets received by the Faraday cage 16.

Accordingly, the peak value detector 36 detects and retains the peak value of the output signal $V_5$, an output signal $V_6$ from which peak value detector 36 is smoothed by the smoothing circuit 37 which in turn generates an output V' which is proportional to the electric charge $q$ that has been carried by the droplets for a longer period of time than that in the arrangement of FIG. 23.

Hereinafter, a recording apparatus according to the present invention wherein the detecting systems of either of FIGS. 23 and 24 is incorporated to form droplets of liquid ink of uniformly controlled size will now be described with particular reference to FIGS. 25 to 27.

Figure 25:
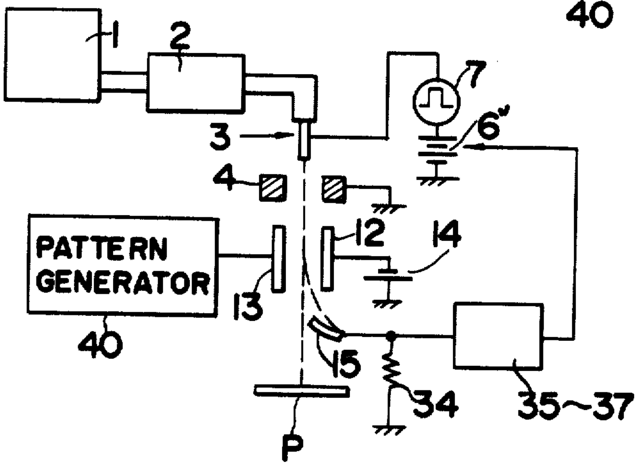

Referring now to FIG. 25, it will be seen that the detecting system composed of the circuits 35, 36 and 37 is applied to the arrangement of FIG. 2. However, it is to be noted that the deflection electrode 13 is shown as electrically connected to a pattern generator 40 and the gutter 15 is electrically connected in part to the ground through the resistor 34 and in part to the detector system 35–37.

Accordingly, it will also be readily seen that the liquid ink pressurized to a suitable value by the pressure applying means 2 is, by the operation of the high voltage DC power source 6'' and high voltage pulse generatr 7, expelled in the form of droplets towards the recording medium P in synchronism with the oscillating frequency of high voltage pulse generator 7.

The droplets thus expelled from the exit end of the nozzle 3 are, so long as no signal is applied from the pattern generator 40 to the deflection electrode 12, deflected towards the gutter 15 by the uniform electric field established by the bias DC power source 14. On the other hand, if an electrical signal is applied from the pattern generator 40 to the deflection electrode 13, the electric field that has been established by the bias DC power source 14 is removed and, therefore, the droplets expelled from the exit end of the nozzle 3 travel successively towards the recording medium P without being deflected.

In view of the foregoing, if the pattern generator 40 is designed such as to generate a voltage of suitably programmed amplitude, a series of consecutive dots and a desired pattern can be delineated on the recording medium P.

More particularly, during a time when the droplets from the exit end of the nozzle 3 are successively collected by the gutter 15 without travelling towards the recording medium P, the electric charge carried by each of the droplets is discharged to the ground through the discharging resistor 34 on one hand and, on the other hand, is detected by the detector system 35–37 which is in turn fed back to the high voltage DC power source 6'' having a voltage regulator to control, by the utilization of the relationships shown in FIGS. 19 and 22, the droplets so as to have uniform diameters *d*.

Figure 26:
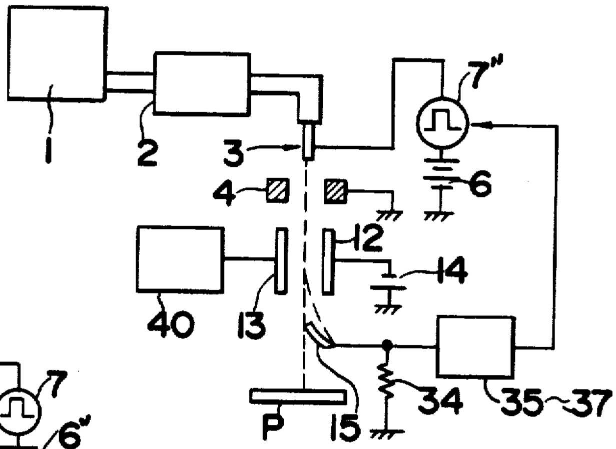
FIG. 25 to FIG. 27 illustrate further modified arrangements of the present invention, whereby the charge detecting principles of FIGS. 23(*a*) and 24(*a*) are employed.

In the arrangement shown in FIG. 26, the electrical charge $q$ detected in the same manner as in the arrangement of FIG. 25 is fed back to the high voltage pulse generator 7'' having a voltage regulator to control, by the utilization of the relationships shown in FIGS. 20 and 22, the droplets so as to have uniform diameter *d*.

Figure 27:
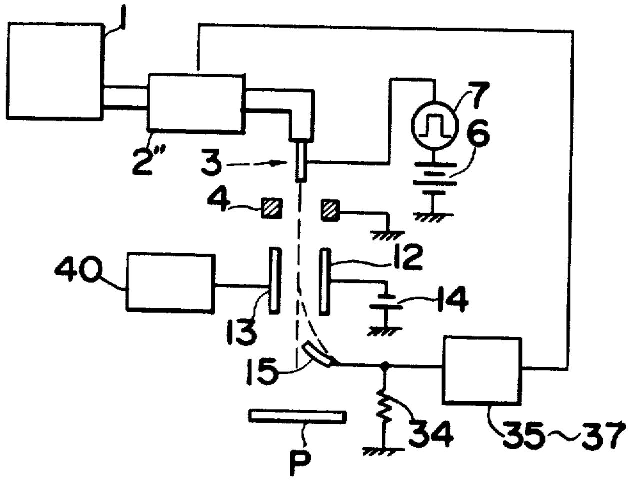

The arrangement shown in FIG. 27 is such that the electric charge $q$ detected in the same manner as in the arrangement of FIG. 25 is fed back to the pressure applying means 2'' having a pressure regulator to control, by the utilization of the relationships shown in FIGS. 21 and 22, the droplets so as to have uniform diameter *d*.

In the foregoing arrangements shown in FIGS. 25 to 27, voltage or pressure indicative of the electric charge $q$ of each of the droplets jetted has been described as fedback. However, a combination of the voltage and the pressure may be adapted to be fedback and, in addition, detection of the electric charge $q$ may be carried out by the system shown in FIG. 24. Moreover, in detecting the electric charge $q$, it may be directly detected as in the case of the foregoing arrangements or otherwise any physical values which may be proportional to the electric charge $q$ may be utilized.

The charge detection systems of FIGS. 25–27 may be employed in the system of FIG. 7.

According to the foregoing arrangements of the present invention, since the electric charge $q$ carried by each of the droplets of liquid ink is detected and fedback to any of the high voltage DC power source, the high voltage pulse generator and the pressure applying means, separately or at the same time, to control the corresponding one of the high voltage DC power, the high voltage pulse and the pressure, respectively generated by the high voltage DC power source, the high voltage pulse generator and the pressure applying means, the droplets of uniform diameter can be obtained and, therefore, they can be advantageously and effectively applied to a printer or a plotter to draw a clear line of uniform ink density and line width.

Figure 29:
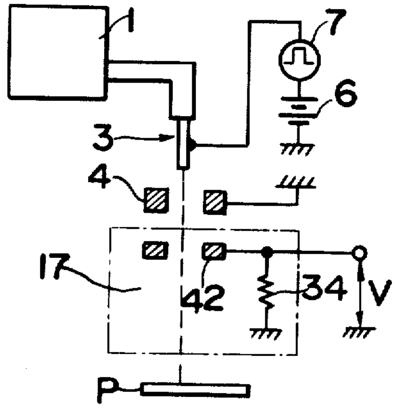
FIG. 29(*a*) is a schematic diagram illustrating one type of drop frequency detector, FIG. 29(*b*) is a schematic diagram of an essential portion of the arrangement of FIG. 29(*a*) showing a manner to detect the frequency of successive droplets jetted, and FIG. 29(*c*) is a schematic diagram showing a train of pulses.
Figure 29:
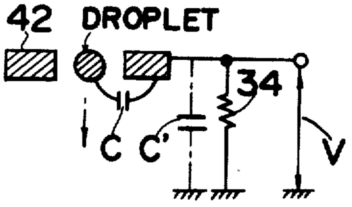
Figure 29:
Figure 30:
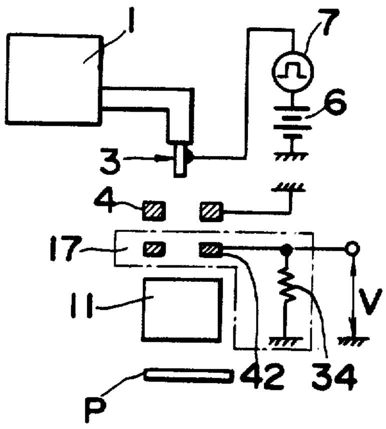
FIG. 30 is a schematic diagram of a second type of drop frequency detector, which is a modification of the arrangement of FIG. 29(*a*)

The principles illustrated in FIGS. 29 and 30 according to the present invention are intended to render the frequency of droplets jetted by the arrangement of FIG. 2 to be uniform. To this end, the embodiment shown in FIG. 29 is designed such that the frequency of the droplets can be detected while the embodiment shown in FIG. 30 is designed such that the frequency of the droplets can be stabilized.

In the system of FIG. 2, in order to synchronize the frequency of the droplets jetted with the oscillation frequency of the high voltage pulse oscillator 7, the oscillation frequency of the high voltage pulse oscillator 7 has to be substantially equal to the intrinsic frequency of the jet of liquid ink which is determined by the physical characteristics of the liquid ink used, the inner diameter of the nozzle 3, the pressure to be applied to the liquid ink, the voltage from the high voltage DC power source 6 and others. If the oscillation frequency of the high voltage pulse oscillator 7 diverges from the intrinsic frequency of the liquid ink jet, not only the intended objects cannot be achieved, but also a problem will arise that the frequency of the droplets is upset.

Figure 28:
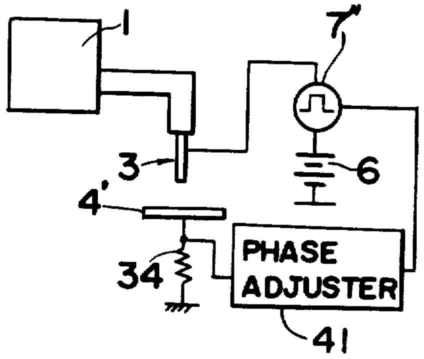
FIG. 28 illustrates a prior art recording device wherein a monitoring unit is provided.

Accordingly, heretofore, in order to detect and monitor the aforesaid synchronized relation, an arrangement such as shown in FIG. 28 has been proposed.

The prior art arrangement of FIG. 28 is such that, instead of the ring electrode 4, an electric conductive plate 4' is employed which is connected to the ground through the discharging resistor 34. In this arrangement, droplets of liquid ink expelled from the exit end of the nozzle 3 by the operation of the high voltage DC power source 6 and the high voltage pulse oscillator 7'', each of which always carries a positive electric charge, impinge, during their travel towards the recording medium, upon the electric conductive plate 4' so that the electric charge of each of the droplets is discharged to the ground through the resistor 34. Accordingly, a voltage pulse appears across the resistor 34, the frequency of which voltage pulse is detected and monitored to monitor the synchronized relation between the oscillation frequency of the high voltage pulse oscillator 7'' and the frequency of the droplets jetted.

For the synchronized relation to be stabilized, the arrangement of FIG. 28 includes a phase adjusting circuit 41 which acts to phase-adjust the pulse train appearing across the resistor 34 and then to feed back to the high voltage pulse oscillator 7''.

In the arrangement of FIG. 28, since detection of the droplet frequency is carried out by the use of the electric conductive plate 4' which functionally corresponds to the ring electrode 4, formation of the liquid jet will be adversely affected. In addition, in the case where the recording medium is placed on the electric conductive plate 4', the electric field established between the plate 4' and each of the droplets jetted is interrupted and, consequently, simultaneous detection of the droplet frequency and recording cannot be carried out without difficulty.

FIGS. 29 and 30 illustrate how, according to the present invention, to eliminate the above described disadvantages, in that a detector for detecting the droplet frequency is arranged between the ring electrode and the recording medium and in position not to disturb the path of travel of the jetted droplets in such a manner as to detect an electric power induced between the detector and each of the jetted droplets as the latter pass therethrough.

Referring first to FIG. 29, the detector of the type referred to above is designated by 17. The detector 17 comprises a detecting ring 42 arranged in coaxially spaced relation to the nozzle 3 and electrically connected to the ground through the discharging resistor 34.

Accordingly, droplets of liquid ink emerging from the exit end of the nozzle 3 successively move towards the ring electrode 4 by which movement of the droplets is accelerated. The droplets passing through the ring electrode 4 further travel towards the recording medium through the detecting ring 42.

As best shown in FIG 29(*b*), as the droplets successively pass through the detecting ring 42, the droplet having an electric charge $q$ instantaneously charges by static induction a static capacitance C between the droplet and the detecting ring 42 and a floating capacitance C' between the detecting ring 42 and the ground. The potential $v$ of the detecting ring 42 at this time can be expressed in the following equation:

$$v = \frac{q}{Co} \times \frac{\frac{CoC}{C + Co}}{\frac{CoC}{C + Co} + C'}$$

wherein Co is a static capacitance of the droplet. Assuming now that $C >> Co$ and $C' >> Co$, then, $v = q/C'$. By way of example, if $q \approx 10^{-12}$ coulomb and $C' \approx 100$ PF, then, $v \approx q/C' = 10$ mV.

After the droplet has passed through the detecting ring 42, the electric load of the capacitance C' is discharged to the ground through the resistor 34. Assuming that the time constant of this discharge is $\zeta$, the time constant $\zeta$ is equal to the product of the capacitance C' times the resistance of the resistor 34. Accordingly, if the resistance of the resistor 34 is 100 KΩ, the time constant $\zeta$ will become $\mu$ sec.

In view of the foregoing, so long as the droplets of the liquid ink are successively jetted, a train of pulses of a waveform as shown in FIG. 29(*c*) appears across the resistor 34, the frequency of which pulse train is substantially equal to the droplet frequency. In other words, detection of the pulse train means detection of the droplet frequency.

In a case where any noise from an external source will affect the performance of the detector 17, the latter may be shielded from the ambient atmosphere except for the path of travel of the droplets of the liquid ink.

The arrangement shown in FIG. 30 is basically similar to that shown in FIG. 29(*a*), but slightly differs therefrom in that a known deflection device 11 is employed. In other words, the arrangement of FIG. 30 is an example wherein the detector 17 including the detecting ring 42 is applied to the ink jet producing system of a type having the known deflection device, in accordance with the teachings of the present invention.

From the foregoing description, it has now become clear that detection of the droplet frequency and recording are separately carried out and, therefore, the provision of the detector does not adversely affect the formation of the droplets to be jetted towards the recording.

As regards the method for stabilizing the droplet frequency, the prior art method therefor has been described with reference to FIG. 28. However, it should be noted that the frequency of droplets jetted is not only governed by the oscillation frequency of the high voltage pulse generator, but also governed by the voltage from the high voltage DC power source that has been superimposed with the high voltage pulse from the high voltage pulse oscillator and the pressure acting on the liquid ink at the exit end of the nozzle or the wetting condition of the exit end of the nozzle. Accordingly, mere synchronization of the droplet frequency does not provide stabilized droplet frequency that lasts for a relatively long period of time.

Figure 31:
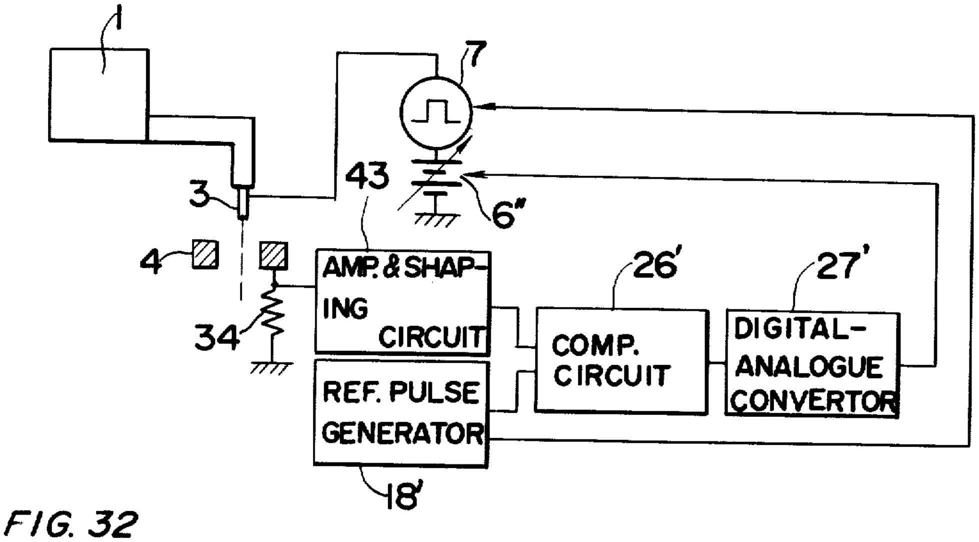
FIG. 31 to FIG. 33 illustrate even further modified to arrangements of the present invention, employing the drop frequency detecting principles of FIGS. 29(*a*) and 30.
Figure 32:
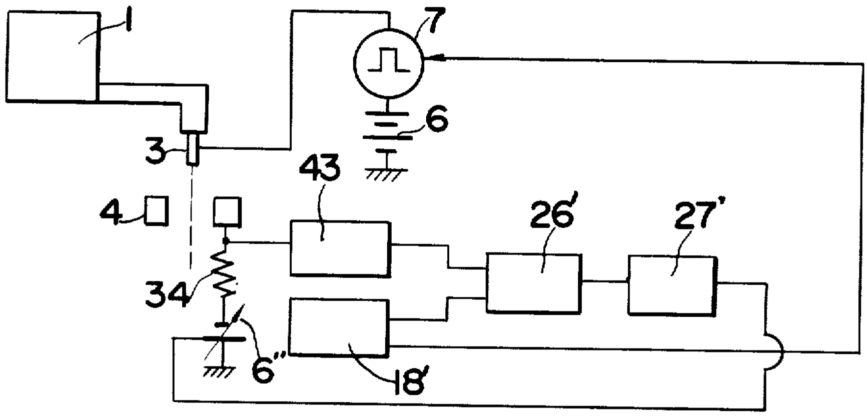
Figure 33:
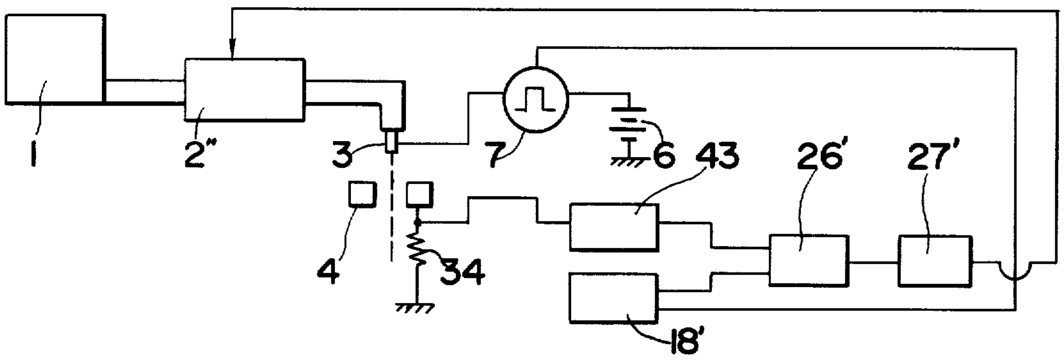

The present invention, so far as the arrangement shown in FIGS. 31 to 33 are concerned, had been made to eliminate the above described disadvantages and is designed such that the detected droplet frequency is compared with a reference frequency which coincides with the high voltage pulse from the high voltage pulse oscillator, a signal indicative of the difference between the detected droplet frequency and the reference frequency being, if the detected droplet frequency does not coincide with the reference frequency, converted into an analogue signal by a digital-analogue converter, which analogue signal is fedback to the voltage regulator of the high voltage DC power source or the pressure regulator of the pressure applying means to cause droplets of the liquid ink to be jetted at a predetermined frequency. This is possible because the droplet frequency is proportional to the voltage of the high voltage DC power source while the same is inversely proportional to the pressure acting on the liquid ink.

Referring first to FIG. 31, a high voltage DC power from the high voltage DC power source 6″ having a voltage regulator, which is superimposed with a pulse voltage from the high voltage pulse oscillator 7, is applied to the ring electrode 4 so that droplets of the liquid ink can be successively jetted from the exit end of the nozzle at a frequency synchronized with the oscillation frequency of the high voltage pulse oscillator 7. A reference pulse oscillator 18′ generates pulses of a frequency substantially equal to the pulse frequency of the high voltage pulse generated by the high voltage pulse oscillator 7. The droplet frequency is detected in the form of a train of pulses appearing across the resistor 34 which is connected to the ring electrode 4 which is provided in place of the detector 17 of the foregoing embodiment of FIG. 29(*a*) or 30. The pulse train representative of the detected droplet frequency is fed through an amplifying and shaping circuit 43 to a comparison circuit 26′ by which the detected droplet frequency is compared with the reference frequency fed from the reference pulse oscillator 18′. So long as the detected droplet frequency coincides with the reference frequency, no output is generated from the comparison circuit 26′. However, if any variation occurs in the ink jet producing system and the detected droplet frequency does not accordingly coincide with the reference frequency, the comparison circuit 26′ generates an output signal indicative of the difference between the detected droplet frequency and the reference frequency, which output signal is in turn fed to the digital-analogue converter 27′ through which the voltage regulator of the high voltage DC power source 6″ is operated to cause the droplet frequency to coincide with the reference frequency fed from the reference pulse oscillator 18′.

In the arrangement shown in FIG. 32, the high voltage DC power source 6″ employed in the arrangement of FIG. 31 is divided into two high voltage DC power sources 6 and 6″ and the output signal from the comparison circuit 26′ is adapted to be fed through the digital-analogue converter 27′ to the voltage regulator of the high voltage DC power source 6″, thereby functioning in a substantially similar manner as in the arrangement of FIG. 31.

The arrangement shown in FIG. 33 is such that while the pressure applying means 2″ employed is of a type having a pressure regulator, the comparison circuit 26′ is, through the digital-analogue converter 27′, connected to the pressure regulator of the pressure applying means 2″. In this arrangement, the output signal from the comparison circuit 26′ is fedback to the pressure regulator until the subsequently detected droplet frequency is corrected so as to coincide with the reference frequency fed from the reference pulse oscillator 18′.

Although not shown, it is possible to practice the present invention in such a manner that, while the output signal from the comparison circuit 26′ is, after having been converted into an analogue signal, fed to the voltage regulator of the high voltage DC power source on one hand, the same signal may be fed to the pressure regulator of the pressure applying means on the other hand.

From the foregoing description in conjunction with the arrangements of FIGS. 31 to 33, it has now become clear that the frequency of droplets of liquid ink jetted towards the recording medium is controlled so as to coincide with the oscillation frequency of the high voltage pulse train fed from the reference pulse oscillator, in such a manner that the pressure to be applied to the liquid ink and/or the high voltage DC power, variation of which may constitute a cause of disturbance of the droplet frequency, are adjusted by the analogue signal converted from the digital signal indicative of the difference between the detected droplet frequency and the reference frequency.

The systems of FIGS. 31–33 relating to control of droplet frequency may be employed in the systems of FIG. 7.

Figure 34:
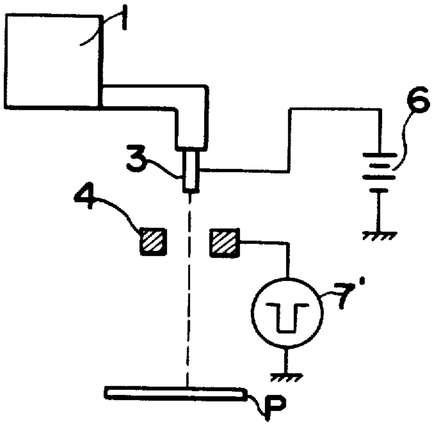
FIG. 34 illustrates a still further modified arrangement of the present invention, wherein high voltage pulses are applied to the ring electrode.

A further feature of the present invention which is shown in FIG. 34 has been designed to permit the system to employ electrical parts having a relatively high withstanding characteristic relative to the voltage applied.

Generally, the droplet frequency tends to be adversely affected by variation of ambient conditions, such as temperature, etc., and, in the system shown in FIG. 1, since the electric field is always established, a jet of liquid ink of stabilized frequency cannot, in fact, be available. To eliminate this, the arrangement such as shown in FIG. 2 has been proposed wherein the positive pulse oscillator 7 is connected in series with the high voltage DC power source 6 to superimpose voltages from these source 6 and oscillator 7 to each other so that by the operation of the pulse oscillator 7, supply and interruption of the ink jet and the frequency of droplets jetted are stabilized.

However, in the arrangement of FIG. 2, since the value of voltage from the high voltage DC power source 6 is relatively high, the pulse oscillator 7 should be composed of electrical parts that can withstand the high DC voltage. By way of example, in the case where the voltage from the high voltage DC power source 6 is in the order of from 2.0 to 2.5 KV and the voltage from the pulse oscillator 7 is in the order of from 0.3 to 1.0 KV, the pulse oscillator 7 should be capable of withstanding voltages of from 2.3 to 3.5 KV. This means that the pulse oscillator tends to become bulky and, therefore, the overall apparatus becomes bulky and expensive.

To avoid the above described disadvantage, according to the embodiment shown in FIG. 34, the nozzle 3 is connected to the ground through the high voltage DC power source 6 while the ring electrode 4 is connected to the ground through the high voltage pulse oscillator 7'. It should be noted that the pulse oscillator 7' is arranged such as to apply a train of pulses of inverted polarity to the ring electrode 4. A jet of the liquid ink from the exit end of the nozzle 3 is created when the pulse train is applied to the ring electrode and it will not be created so long as no pulse is applied thereto from the pulse oscillator 7'.

More specifically, by the pressure acting on the exit end of the nozzle 3 and also by the ink pumping action of the high voltage DC power source 6, a meniscus of the liquid ink such as shown in FIG. 5 is formed at the exit end of the nozzle 3 in readiness for its travel towards the recording medium. Subsequently, when a pulse of inverted polarity is applied to the ring electrode 4 from the high voltage pulse oscillator 7', the applied pulse acts to attract the ink and gives a pulse of sufficient amplitude required for the droplet of the liquid ink to travel towards the recording medium and, consequently, droplets of the liquid ink are successively jetted towards the recording medium.

In the arrangement of FIG. 34, if pulses of inverted polarity from the high voltage pulse oscillator 7' have a predetermined frequency, the ink jet producing system will be the one wherein the droplets produced have a frequency substantially equal to the predetermined frequency of the pulses from the oscillator 7'. As hereinbefore described, the frequency of droplets of the liquid ink jetted is preferably synchronized with the intrinsic frequency of the liquid ink that is determined by the inner diameter of the nozzle 3, the pressure acting on the exit end of the nozzle 3 and the surface tension and viscosity of the ink used.

In summary, the arrangement shown in FIG. 34 is such that the pulse oscillator 7' and the high voltage DC power source 6 are separated from each other and not connected in series with each other and, therefore, it is clear that the pulse oscillator 7' is not required to be composed of electrical parts having a relatively high voltage withstanding characteristic.

Figure 35:
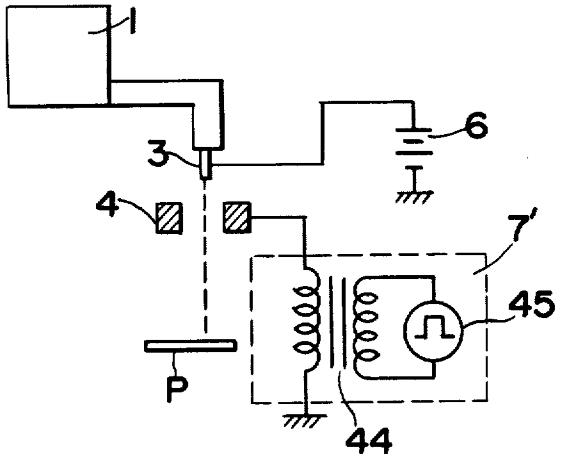
FIGS. 35 and 36 are block diagrams showing different arrangements, respectively, of a pulse generator which may be employed in the arrangement of FIG. 34.
Figure 36:
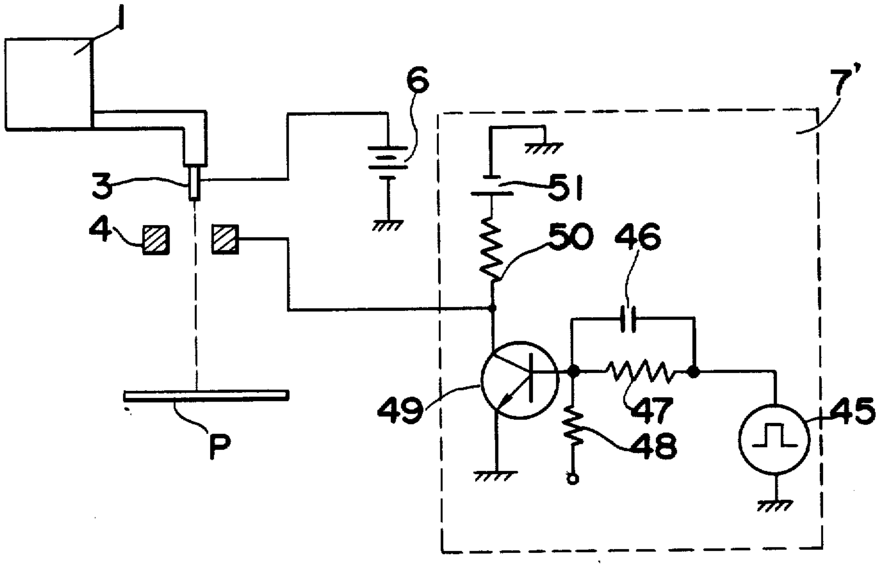

The details of the pulse oscillator 7' are shown in FIGS. 35 and 36.

In FIG. 35, the pulse oscillator 7' includes a voltage increasing transformer 44 having a primary winding connected with a pulse generator 45 capable of generating pulses of relatively low voltage and a secondary winding connected to the ring electrode 4 so that pulses of high voltage induced in the secondary winding of the transformer 44 can be applied to ring electrode 4. It should be noted that the transformer 44 need not be of a type capable of withstanding a relatively high voltage.

The pulse oscillator shown in FIG. 36 employs a semi-conductor element and is designed such that voltage pulses generated from the pulse generator 45 are applied through a parallel circuit of resistor 47 and capacitor 46 to the base of a transistor 49 to trigger the latter on to control the voltage to be applied to the ring electrode 4 from a DC power source 51 through a resistor 50.

Although in the foregoing arrangement of FIGS. 34 to 36, it has been described that the ink pumping action is established by connecting the negative pulse oscillator to the ring electrode, it should be noted that the present invention is not limited thereto. Alternatively, it may be possible to connect the positive pulse oscillator to the ring electrode so as to apply positive pulses to the ring electrode to achieve an ink sucking action, in which case the jet of the liquid ink is interrupted when positive pulses are applied to the ring electrode and is performed when no positive pulse is applied thereto.

The features illustrated in FIGS. 34–36 may be employed in the system of FIG. 7.

Although the features of the present invention have been fully described in conjunction with the preferred arrangement thereof, it should be noted that various changes and modifications will be apparent to those skilled in the art. Such changes and modifications are to be construed as included within the true scope of the present invention unless otherwise they depart therefrom.

What is claimed is:

1. In an X-Y plotter of the ink jet type including a recording head including a nozzle and a recording medium relatively movable with respect to each other; means for producing a jet of liquid ink discharged from said nozzle along a path toward said recording medium; a gutter disposed adjacent said path; and deflection means adjacent said path for causing a portion of said jet to deflect from said path and pass to said gutter; the improvement comprising:

said jet producing means comprising a ring electrode spaced from and coaxially arranged with respect to an exit end of said nozzle, and means for applying a pulsating voltage between said nozzle and said ring electrode, thereby producing droplets of ink;

means for detecting the relative velocity of movement between said recording head and said recording medium and for generating an electric signal representative thereof; and said means for applying a pulsating voltage between said nozzle and said ring electrode including pulse voltage applying means, connected to said velocity detecting means and to said deflection means, for receiving said signal and for generating and applying voltage pulses to said deflection means for thereby deactivating said deflection means to prevent deflection of said ink droplets to said qutter and to allow said ink droplets to pass to said recording medium, said voltage pulses being at a frequency proportional to said relative velocity and at times synchronized with the passage of ink droplets past said deflection means, said frequency being $1/n$ times the frequency of said pulsating voltage applied between said nozzle and said ring electrode, wherein $n$ is an integer, and whereby said deflection means is deactivated at a frequency proportional to said relative velocity and, whereby a uniform ink deposit on said recording medium is achieved.

2. The improvement claimed in claim 1, further comprising a ring-shaped shielding electrode arranged coaxially with respect to said nozzle means, said shielding electrode having a surface thereof closest to said ring electrode positioned in a plane no closer to said ring electrode than a plane passing through said exit end of said nozzle means; and means for applying a bias potential to said shielding electrode.

3. The improvement claimed in claim 2, wherein a potential difference between said shielding electrode and said ring electrode is less than said potential difference between said nozzle means and said ring electrode.

4. The improvement claimed in claim 1, wherein said jet producing means forms said jet into electrically charged droplets; and further comprising means for detecting the electric charge of each of said droplets and for generating electric signals representative of said charge; and means for feeding said charge representing signals back to said droplet forming means for controlling the operation thereof.

5. The improvement claimed in claim 4, wherein said means for applying a pulsating voltage between said nozzle and said ring electrode comprises a high voltage DC power source means connected to said nozzle for applying a DC voltage to said ink, and pulse means for superimposing high voltage pulses on said DC voltage.

6. The improvement claimed in claim 4, wherein said jet producing means further includes means for pressurizing said ink, said pressurizing means including a pressure regulator; and further comprising means for feeding said charge representing signals back to said pressure regulator for regulating operation of said pressurizing means.

7. The improvement claimed in claim 1, further comprising means for detecting the frequency of said droplets without contacting any of said droplets and for generating a signal representative of said detected frequency; means for generating a reference frequency signal; means for comparing said detected frequency signal and said reference frequency signal and for generating a comparative signal representative of any difference therebetween; and means for supplying said comparative signal to said droplet forming means to control the operation thereof.

8. The improvement claimed in claim 7, wherein said comparative signal is a digital signal; and said comparative signal supplying means comprises means for converting said digital signal into an analogue signal proportional to said difference.

9. The improvement claimed in claim 8, wherein said means for applying a pulsating voltage between said nozzle and said ring electrode comprises a high voltage DC power source means connected to said nozzle for applying a DC voltage to said ink, and pulse means for superimposing high voltage pulses on said DC voltage.

10. The improvement claimed in claim 9, wherein said droplet forming means further includes means for pressurizing said ink, said pressurizing means including a pressure regulator.

11. The improvement claimed in claim 1, wherein said means for applying a pulsating voltage between said nozzle and said ring electrode comprises DC power source means connected to said nozzle for appling a DC voltage thereto; and pulse means connected to said ring electrode for applying high voltage pulses to said ink.

12. The improvement claimed in claim 1, wherein said pulse voltage applying means for applying voltage pulses to said deflection means includes a clock pulse oscillator.

13. The improvement claimed in claim 12, wherein said pulse voltage applying means further includes delay circuit means for synchronizing application of said voltage pulses to said deflection means to time when said ink droplets pass said deflection means.

14. The improvement claimed in claim 1, wherein said pulse voltage applying means includes means for commencing operation thereof upon receipt of a command signal indicative of the start of relative movement between said recording head and said recording medium.

15. An X-Y plotter of the ink jet type comprising:

a recording head including a nozzle and being relatively movable wih respect to a recording medium;

a ring electrode spaced from and coaxially arranged with respect to an exit end of said nozzle;

a high voltage DC power source means connected across said nozzle and said ring electrode for applying a DC voltage to ink in said nozzle;

pulse means for superimposing high voltage pulses on said DC voltage to thereby form said ink into droplets discharged from said nozzle along a path toward a recording medium;

a gutter disposed adjacent said path;

deflection means adjacent said path for causing a portion of said jet to deflect from said path and pass to said gutter;

clock pulse oscillator means connected to said pulse means for controlling the frequency of said superimposed high voltage pulses and thereby of said droplets discharged from said nozzle;

means for detecting relative velocity of movement between said recording head and recording medium and for generating an analogue signal representative thereof;

converter means, connected to said clock pulse oscillator means and said velocity detecting means, for receiving said analogue signal and for generating a train of voltage pulses to said deflection means for thereby deactivating said deflection means to prevent deflection of said ink droplets to said gutter and to allow said ink droplets to pass to said recording medium, said train of voltage pulses being at a frequency proportional to said relative velocity and equal to $1/n$ times the frequency of said superimposed voltage pulses and of said droplets discharged from said nozzle, wherein $n$ is an integer, and whereby said deflection means is deactivated at a frequency proportional to said relative velocity, and whereby a uniform ink deposit on said recording medium is achieved; and delay means, between said converter means and said deflection means, for synchronizing application of said train of voltage pulses to said deflection means to times when said droplets pass therethrough.

* * * * *